April 21, 1936.  H. J. GOFF  2,038,510
METHOD OF AND APPARATUS FOR MAKING BOX ENDS
Filed March 14, 1934  4 Sheets-Sheet 1
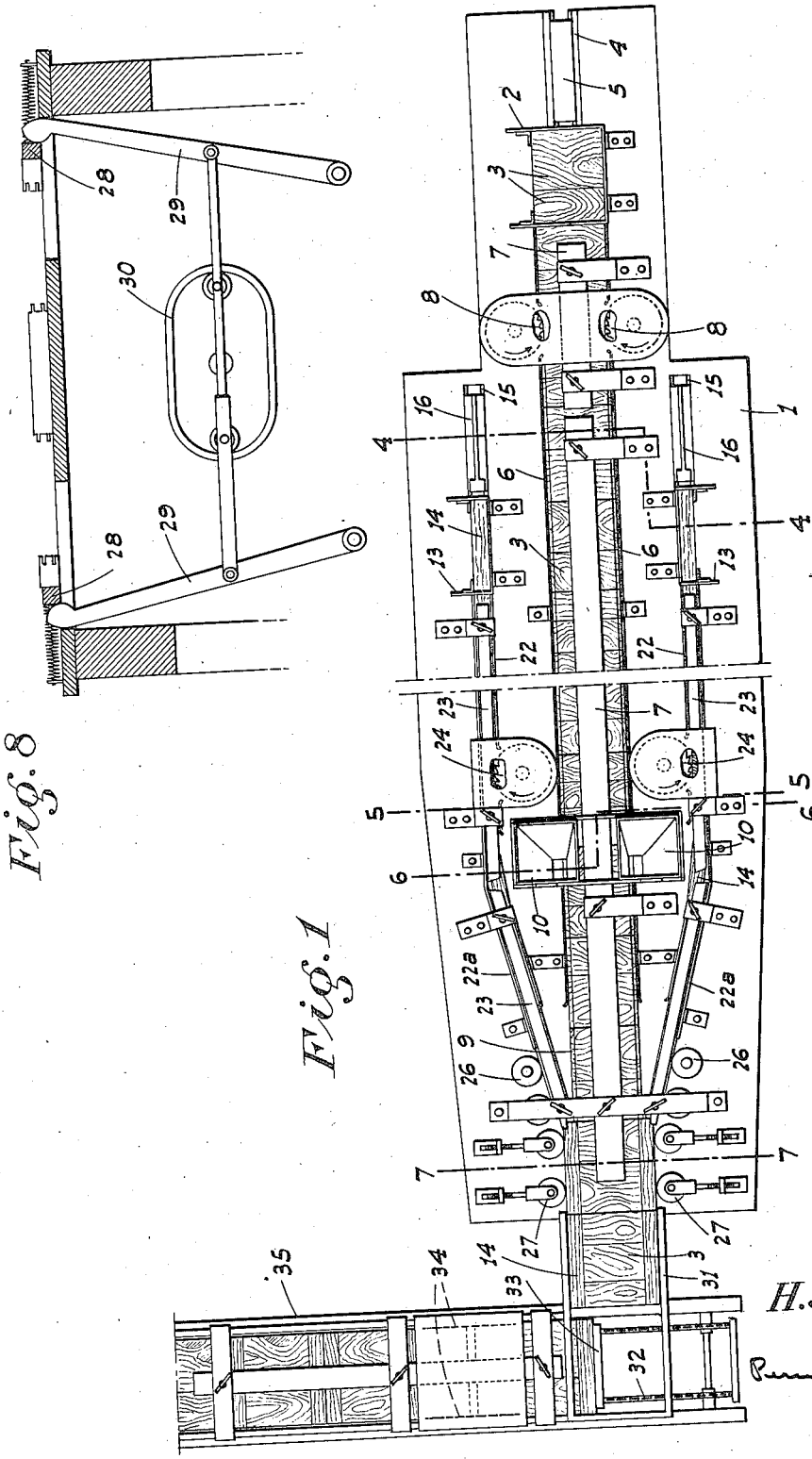
INVENTOR
H. J. Goff
ATTORNEY April 21, 1936.　　　H. J. GOFF　　　2,038,510
METHOD OF AND APPARATUS FOR MAKING BOX ENDS
Filed March 14, 1934　　　4 Sheets-Sheet 2
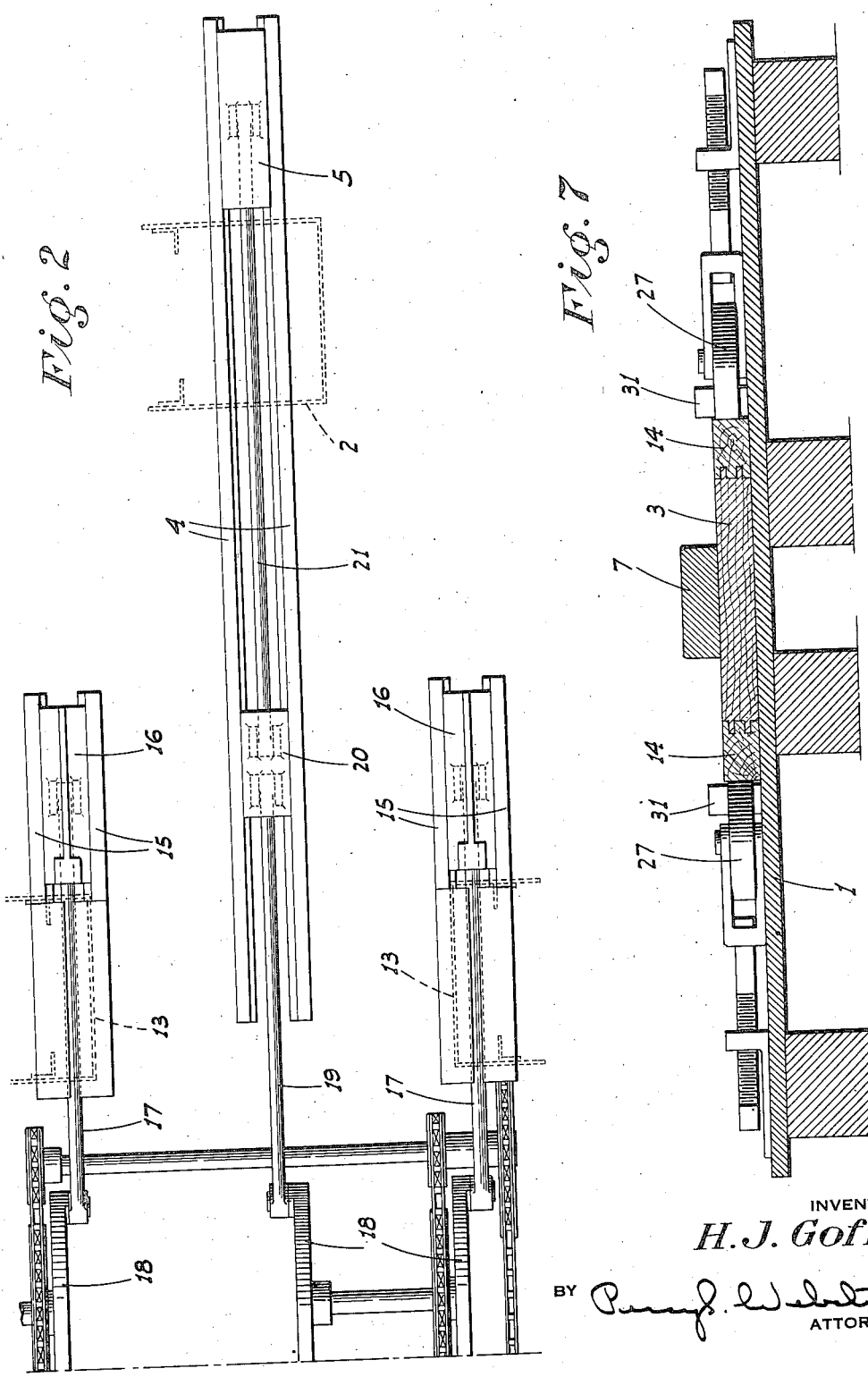
INVENTOR
H. J. Goff
BY
ATTORNEY April 21, 1936.  H. J. GOFF  2,038,510
METHOD OF AND APPARATUS FOR MAKING BOX ENDS
Filed March 14, 1934  4 Sheets-Sheet 3
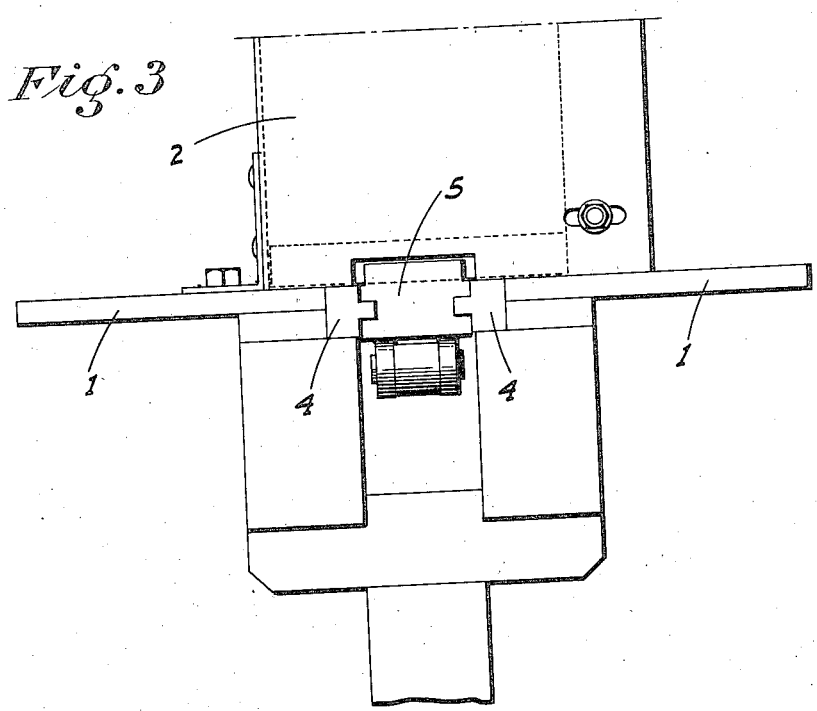
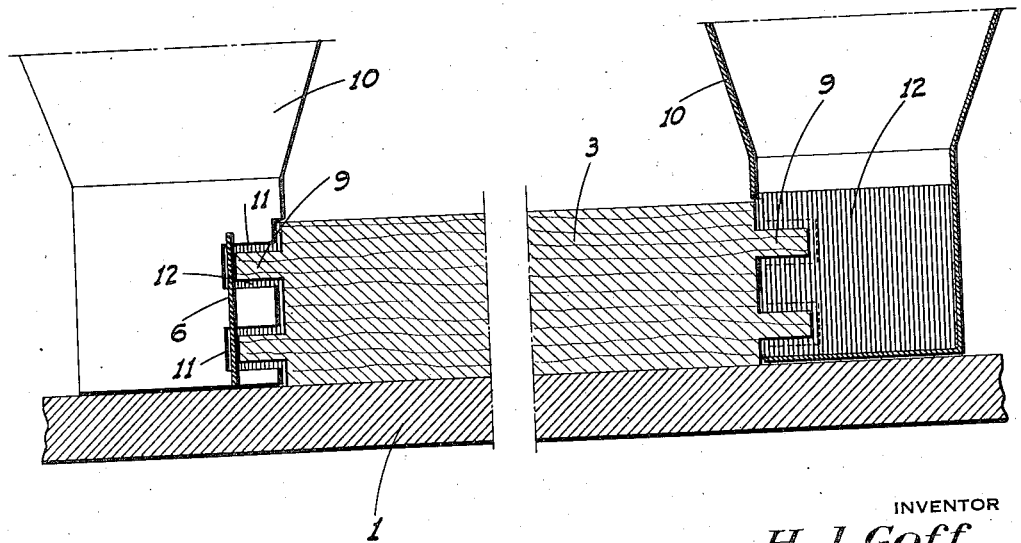
INVENTOR
H.J. Goff
BY
ATTORNEY

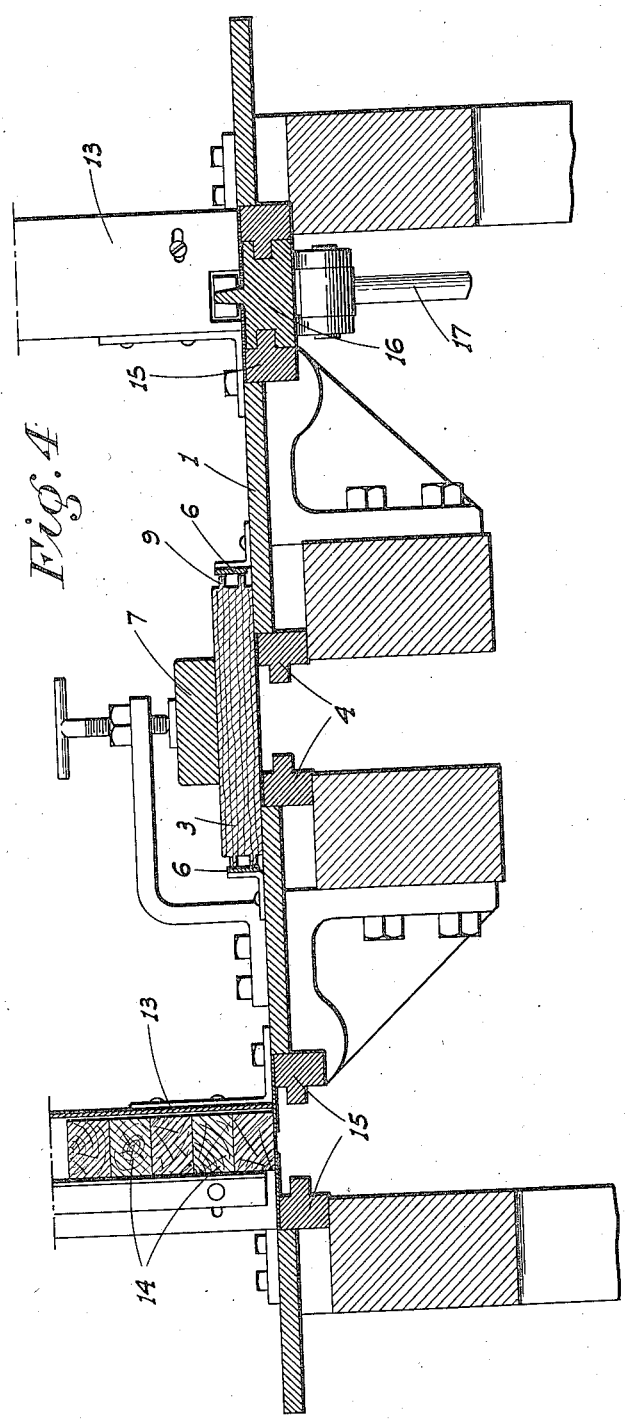
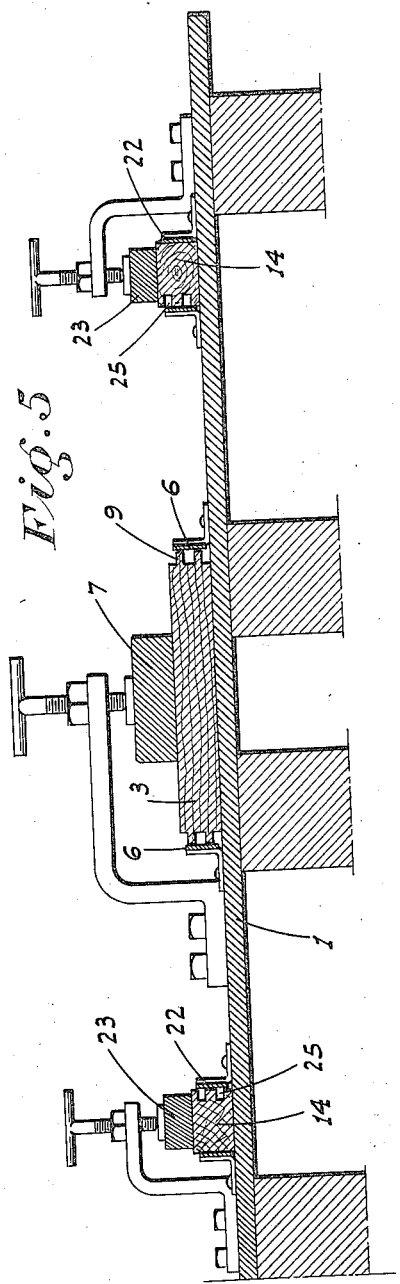

Patented Apr. 21, 1936

2,038,510

UNITED STATES PATENT OFFICE 2,038,510

METHOD OF AND APPARATUS FOR MAKING BOX ENDS

Henry J. Goff, Stockton, Calif.

Application March 14, 1934, Serial No. 715,465

9 Claims. (Cl. 144—7)

This invention relates to box ends for fruit shipping boxes and particularly to the manufacture of such ends mainly from scrap or waste material instead of from a single piece of wood as has been customary heretofore. Such scrap ends comprise a body consisting of scrap pieces of odd sizes, held together by end cleats. The principal object of my invention is to provide a method of assembling and uniting such parts, and a machine for carrying out the steps necessary to the assembling and uniting operations, so arranged that no manual handling of the parts is necessary other than the initial placing of the same in the feed hoppers, and the removing of the same when united and assembled to be sawed through to form a pair of the ends; all the intermediate assembling and uniting of the parts being carried out automatically and in continuous sequence.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a top plan view of the machine.

Figure 2 is a similar view of the parts advancing mechanism of the machine.

Figure 3 is a fragmentary head end view of the machine.

Figure 4 is a cross section on the line 4—4 of Figure 1.

Figure 5 is a similar view on the line 5—5 of Figure 1.

Figure 6 is an enlarged fragmentary section on the line 6—6 of Figure 1.

Figure 7 is a cross section on the line 7—7 of Figure 1.

Figure 8 is a diagrammatic cross section showing a modified form of cleat moving mechanism.

Referring now more particularly to the characters of reference on the drawings, the numeral 1 denotes a table of suitable size, upstanding from which adjacent its head end is a hopper 2 for the waste pieces 3 which form the body of the box ends. These pieces are all initially cut to the same length (lengthwise of the grain but transversely of the table) and are also cut previous to being placed in the hopper so that a certain number of pieces (preferably two or three) together form a unit of the same width or of the same length relative to the length of the table. These operations are as above stated carried out before the parts are placed in the hopper, and after each number of pieces has been put together and cut to said desired width, they are maintained segregated from other units and placed in the hopper in the proper order.

Extending lengthwise of the table under and in front of the hopper are transversely spaced guides 4 for a pusher head 5 which projects above the table to a height less than the thickness of a single block unit. The head is reciprocated through a stroke somewhat longer than the width of a unit and from a starting point in front of the hopper by means which will be described later.

The units pushed from the hopper and advanced toward the opposite end of the table by the pusher head, move between guide plates 6 and are held down against the table by vertically adjustable presser bars 7 extending lengthwise of the guides. As said units are advanced they are engaged on their opposite edges by constantly driven circular saws 8 arranged and positioned to cut a pair of vertically spaced tongues 9 in the pieces of the units along said opposite edges.

Some distance along the table from the saws are upstanding vessels 10 containing a suitable grade of glue or other cementitious material. The vessels adjacent the bottom and on their adjacent sides are open, and their ends are cut symmetrical to but larger than the tongues 9 as shown at 11 in Figure 6 so that said tongues project into the vessels and the side edges of the pieces of the units 3 close the open sides of the same. A close fit with the tongued contour of the pieces, preventing the glue from spilling from the ends of the vessels to any material extent, is had by means of flexible strips 12 disposed inside the vessels and cut to closely follow the tongued edges as shown in Figure 6. A short distance beyond the glue vessels the guides 6 terminate as shown in Figure 1 for a purpose which will be seen later.

Mounted on and upstanding from the table rearwardly of the saws 8 and spaced outwardly from the guides 6 some distance are hoppers 13 for the end cleats 14 of the box ends, whose length is the same as the width of the units 3. Guideways 15 extend lengthwise of the table under and adjacent the hoppers and support pusher heads 16 movable lengthwise of the table to engage and push the lowest cleats out of the hoppers in the same manner as the pusher heads 5. These heads are reciprocated through a stroke somewhat greater than the length of a cleat, by connecting rods 17 pivoted thereon and under the same and extending to eccentric connections with driven wheels or cranks 18 concentric with each other and disposed under the table preferably some distance beyond the hoppers in the direction of advancing movement of the cleats.

The head 5 is also driven from one of said wheels 18 so that it moves simultaneously with and at the same speed as the heads 16. In order to avoid the use of a single connecting rod between said wheel and the head 5, and which would be excessively long due to the distance between the wheel and said head, a connecting rod 19 extends from the wheel 18 to a cross head 20 mounted on the guides 4 in transverse alinement with the heads 16; the cross head and the head 5 being rigidly connected by a horizontal tie rod 21. The above features of construction are plainly shown in Figure 2.

The cleats 14 as they leave the hoppers are received between guide plates 22 which extend parallel to the guides 6 for a certain distance. While the cleats move along the guides as they are intermittently advanced by the reciprocating action of the pusher heads, said cleats are held down against the table by vertically adjustable bars 23 and are acted on by constantly driven circular saws 24. These saws are positioned between the cleats and the guides 6 and act on the adjacent longitudinal edges of the cleats to cut grooves 25 therein in symmetrical relation to the tongues 9.

Beyond the saws the guides 22 converge toward each other as at 22a so as to bring the cleats toward the side edges of the units 3. The inner ones of the guide plates 22a terminate where the guides 6 terminate, while the outer plates 22a extend somewhat further and are then replaced by rollers 26 alined with the converging portion of said guides. Beyond the rollers 26 are rollers 27 which are mounted for adjustment transversely of the table. The opposed rollers 27 are spaced so as to closely confine a unit 3 and a pair of cleats therebetween, so that as the cleats converge toward the grooved edges of the units by reason of the guides 22a and rollers 26, and are then suddenly straightened out as their leading ends are received between the rollers 27, they will be pressed into firm engagement with the units.

The guides being removed between the adjacent edges of the cleats and the units 3 for a length greater than the length of a cleat, permits the cleats to snap into place against the units as soon as the cleats initially engage the rollers 27 and the adjacent ends of the units. As soon as the cleats suddenly shift into alinement and engagement with the units the advancing action on the cleats themselves of course ceases. The advancing action however is still present on the row of units, and the cleats being now in firm glued contact with the edges of the units, said cleats and units then move further without shifting relative to each other. The hoppers for the cleats and units are disposed relative to each other so that as the various parts come together in the manner above stated, their ends will aline in common transverse alinement.

While the above arrangement is simple and has proved very effective, I may provide a mechanical means for bringing the cleats against the units as shown in Figure 8. In this structure the cleat guides do not converge toward each other and at a desired point they are formed as transversely movable elements 28 substantially the length of a cleat and engaging the outer side of the same. These elements are engaged by the upper ends of pivoted levers 29 which are disposed under the table and are operated by a driven cam 30 with suitable connections between the levers and cam so that the upper ends of both levers are suddenly drawn toward each other simultaneously to cause the cleats to be pressed into engagement with the central box end unit. The cam is of course driven in timed relation to the advancing of the box end parts, in such a manner that the transverse movement of the levers and cleats takes place during the retractive movement of the cleat and unit advancing heads, when said cleats and units are stationary.

After the parts have been assembled to form the complete box ends in the manner above stated, they pass between guides 31 and are delivered onto endless chains 32 or the like which preferably extend transversely of the table and have cleats 33 projecting upwardly therefrom at intervals. These cleats engage the box ends along one of the cleats 14 and force said ends past trimming saws 34 to assure the final even alinement of the ends of the cleats 14 with the central pieces 3, since it sometimes occurs that when initially assembled the parts slip out of line slightly at their ends. Beyond the trimming saws the box ends move along a chute 35 from which they are removed for stacking until the glue is thoroughly dried. Said box ends are then sawed centrally of their thickness to make a pair of ends out of each one, since they are initially the double thickness of the final product.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A machine for making box ends which consist of a central unit and end cleats, comprising separate hoppers for a stack of the units and cleats arranged so that a pair of cleats will always be disposed in proper order relative to but spaced from a unit, means to feed and advance such unit and cleats simultaneously from the respective hoppers in the same direction and lengthwise of the cleats while maintaining them in transverse alinement, separate means to tongue and groove the facing edges of the unit and cleats as they are advancing, and means to subsequently shift the cleats into pressing engagement with the unit whereby the tongues and grooves are moved into cooperating relation with each other.

2. The method of making box ends from a central unit and end cleats comprising advancing a unit and a pair of cleats simultaneously at a common speed in the same direction and in proper but initially spaced relationship transversely, cutting tongues and grooves in the adjacent edges of the unit and cleats respectively while they are advancing, applying glue to the tongued edges of the unit with a subsequent advancing movement, and finally moving the cleats into pressing relationship with the glued edges of the unit during a further advance of the cleats and unit.

3. A machine for making box ends which consist of a central unit and end cleats, comprising a table, a hopper for a stack of the units upstanding therefrom, separate hoppers for stacks of end cleats upstanding from the table and spaced outwardly from the planes of the side edges of the units a predetermined distance and positioned so that a pair of cleats will be transversely alined with a unit, means to simultaneously advance a unit and a pair of cleats from the respective hoppers along the table at a common speed while maintaining them transversely spaced, saws to tongue the side edges of the unit as it advances disposed on the table in the spaces between the units and cleats, other saws to correspondingly groove the unit-engaging edges of the cleats disposed on the table in said spaces and in longitudinally spaced relation to the first named saws, and means on the table beyond the saws to shift the cleats inwardly to bring the adjacent tongued and grooved edges of the unit and cleats into cooperating engagement.

4. In a machine for making box ends which consist of a central unit and end cleats, a table, a hopper for a stack of the units upstanding from the table, separate hoppers for stacks of end cleats upstanding from the table in transversely spaced relation on opposite sides of the unit hopper, the table having longitudinal slots under the hoppers whose width is less than that of the respective parts in the hoppers, separate heads under the table and slots, elements projecting upwardly from the heads and through the slots to simultaneously engage one end of the parts in the hoppers, means mounted under the table to support and guide the heads for movement lengthwise of the table and slots, a driven shaft, and connections between the shaft and heads to reciprocate the latter at a common speed and for a common stroke whose length is greater than the length of the cleats and units.

5. A structure as in claim 4, in which said driven shaft extends transversely of and under the table and said connections comprise axially alined crank pins operatively connected to said shaft, and connecting rods between said pins and the heads.

6. In a machine for making box units composed of grooved cleat and slat members, means for laterally advancing a set of slat members with their ends free, means for advancing a pair of cleat members in spaced relation from said slat members and in the same plane, and means for gradually changing the relative position of said members to cause successive initial insertion of each of the foremost corners of each of said slats into the corresponding grooves of said cleats and then gradually a complete insertion of the full width ends of the slat members into said grooves.

7. In a machine for making box units composed of slats and grooved cleats, mechanism for laterally advancing a set of intermediate slats and endwise advancing a set of outwardly disposed cleats in spaced relation and in parallel paths of travel and in the same plane with the grooves of the cleats facing the ends of the slats, and assembling cams for shifting cleats from a parallel into an angular path of travel with respect to the path of travel of said slats and toward the ends of the latter with the foremost ends of the cleats nearest the foremost corners of each of the foremost slats for initial insertion thereof into the grooves and consecutive insertion of the foremost corners of successive following slats and gradual and following insertion of the full width of all the slat ends into the grooves.

8. In a machine for making box units composed of slats and grooved cleats, mechanism for laterally advancing a set of slats and a set of cleats along parallel paths of travel, pressure means extending longitudinally and substantially centrally of the path of travel of said slats and engaging opposite faces of the latter and the ends being free, and diverting cams for shifting the cleats into assembled relation with the free ends of the slats while the latter are engaged by said pressure means.

9. The method of making box units which are composed of initially separate grooved cleat and slat members, comprising laterally advancing a set of slat members with their ends free, advancing a pair of cleat members in the same plane as the slat members while holding them initially spaced therefrom on opposite sides thereof, and then gradually changing the relative position of said members to obtain first a successive initial insertion of the foremost corners of each of the slat members into the corresponding grooves of the cleat members, and then a complete insertion of the end edges of the slat members into said grooves.

HENRY J. GOFF.